US008495572B2

(12) United States Patent
Bernin

(10) Patent No.: US 8,495,572 B2
(45) Date of Patent: Jul. 23, 2013

(54) APPARATUS AND METHOD FOR IDENTIFYING CONTEXTUAL CHANGES IN SOURCE CODE

(75) Inventor: Olivier Bernin, Sandyford (IE)

(73) Assignee: International Business Machines Corporation, Armonk, NY (US)

( * ) Notice: Subject to any disclaimer, the term of this patent is extended or adjusted under 35 U.S.C. 154(b) by 1066 days.

(21) Appl. No.: 12/025,880

(22) Filed: Feb. 5, 2008

(65) Prior Publication Data

US 2008/0244522 A1 Oct. 2, 2008

(30) Foreign Application Priority Data

Mar. 29, 2007 (EP) .................................... 07105189

(51) Int. Cl.
*G06F 9/44* (2006.01)
*G06F 9/45* (2006.01)
(52) U.S. Cl.
USPC ............................................ 717/122; 717/143
(58) Field of Classification Search
None
See application file for complete search history.

(56) References Cited

U.S. PATENT DOCUMENTS

| | | | |
|---|---|---|---|
| 4,809,170 A | | 2/1989 | Leblang et al. |
| 6,993,710 B1 * | | 1/2006 | Coad et al. .................... 715/202 |
| 7,290,251 B2 * | | 10/2007 | Livshits .......................... 717/143 |
| 2004/0230886 A1 * | | 11/2004 | Livshits .......................... 715/500 |
| 2005/0028143 A1 | | 2/2005 | Aridor et al. |
| 2006/0174344 A1 * | | 8/2006 | Costea et al. .................. 726/24 |
| 2006/0271597 A1 * | | 11/2006 | Boske ............................ 707/200 |
| 2007/0038637 A1 * | | 2/2007 | Taneja et al. .................... 707/10 |
| 2007/0283321 A1 * | | 12/2007 | Hegde et al. ................... 717/110 |
| 2008/0071805 A1 * | | 3/2008 | Mourra et al. ................. 707/100 |
| 2008/0072210 A1 * | | 3/2008 | Rush et al. ...................... 717/121 |
| 2008/0086718 A1 * | | 4/2008 | Bostick et al. ................. 717/120 |

FOREIGN PATENT DOCUMENTS

EP 0805391 A2 11/1997

OTHER PUBLICATIONS

PCT Notification of Transmittal of the International Search Report and the Written Opinion of the International Searching Authority, or the Declaration, Date of Mailing Jun. 5, 2008. PCT International Search Report and Written Opinion of the International Searching Authority attached.

* cited by examiner

*Primary Examiner* — Li B Zhen
*Assistant Examiner* — Evral Bodden
(74) *Attorney, Agent, or Firm* — Jeff Tang; Hoffman Warnick LLC

(57) ABSTRACT

An apparatus for identifying a contextual change to a source code file, in a development environment, the apparatus including: a detector component for detecting a modification to the source code file; a requester component for retrieving a previous version of the modified source code file; a parser component for parsing a first source code set associated with the source code file and a second source code set associated with the previous version of the source code file and for building an in-memory representation of the first and second source code sets; and a comparator component for comparing the in-memory representation of the first source code set with the in-memory representation of the second source code set in order to generate contextual information identifying a change made to a source code element associated with the modified source code set.

15 Claims, 6 Drawing Sheets

Previous version of the file:

```
package com.ibm.somepackage;

public class SomeClass extends SomeParentClass { protected someMethod(String parameter) {
        ....
    }
}
```
{ 400

New (i.e. changed) version of the file:

```
package com.ibm.somepackage;

public class SomeClass extends SomeParentClass { public someMethod(String parameter) {
        ....
    }
}
```
{ 405

Fig. 4

APPARATUS AND METHOD FOR IDENTIFYING CONTEXTUAL CHANGES IN SOURCE CODE

FIELD OF THE INVENTION

The invention relates to the field of source code management systems. In particular, the present invention relates to an apparatus and method for identifying contextual changes to source code in source files.

RELATED ART

Source code stored in source code management systems is typically retrieved by developers when a change to the source code needs to be made. Once the changes have been made, the source code file is saved. The source code is then built to produce a set of binaries. The integrity of the source code, i.e., if it compiles properly, can be tested locally against the set of source code retrieved initially, but if changes were made concurrently on portions of the source code that are depending on each other, the integrity of the set of source might not be preserved, compilation will fail, and the build is compromised.

Build breaks are not only a waste of time, as compromised builds are unusable by testers to test the product and by developers, to fix defects. Repeated build breaks also lead to unstable sets of source code. Stabilising the source set is tedious and slows down the overall development process.

More generally, developers are often not aware of code changes made in the source set until it is built, particularly in the case of big software development projects, and even more so when developers are in different geographic locations. This presents a problem in that developers spend a considerable amount of time trying to identify which source code has been updated, deleted or added since the last version of the source code file.

One solution to this problem is provided in U.S. Pat. No. 4,809,170 in which a support system for computer-aided software engineering applications is provided. This system provides configuration management and features such as transparent retrieval of base versions of program sequences as well as task monitoring and reporting. A modification record is maintained for all changes to the modules in the system build library by version numbers.

However, the system only provides the user with the raw source code and still places a heavy burden on the developer, architect, etc., to analyse and understand contextually what part of the source code has changed.

SUMMARY OF THE INVENTION

Viewed from a first aspect, the present invention provides an apparatus for identifying a contextual change to a source code file, in a development environment, comprising: a detector component for detecting a modification to the source code file; a requester component for retrieving a previous version of the modified source code file; a parser component for parsing a first source code set associated with the source code file and a second source code set associated with the previous version of the source code file and for building an in-memory representation of the first and second source code sets; and a comparator component for comparing the in-memory representation of the first source code set with the in-memory representation of the second source code set in order to generate contextual information identifying a change made to a source code element associated with the first source code set.

Viewed from a second aspect, the present invention provides a method for identifying a contextual change to a source code file, in a development environment, comprising: detecting a modification to the source code file; retrieving a previous version of the modified source code file; parsing a first source code set associated with the source code file and a second source code set associated with the previous version of the source code file and for building an in-memory representation of the first and second source code sets; and comparing the in-memory representation of the first source code set with the in-memory representation of the second source code set in order to generate contextual information identifying a change made to a source code element associated with the first source code set.

Viewed from a third aspect, the present invention provides a computer program product loadable into the internal memory of a digital computer, comprising software code portions for performing, when the computer program product is run on a computer, to carry out the invention as described above.

BRIEF DESCRIPTION OF THE DRAWINGS

Embodiments of the invention are described below in detail, by way of example only, with reference to the accompanying drawings.

FIG. 4 illustrates a portion of source code which has been updated and the output text of the analyser component in accordance with an embodiment of the present invention

DETAILED DESCRIPTION OF THE INVENTION

Figure 1:
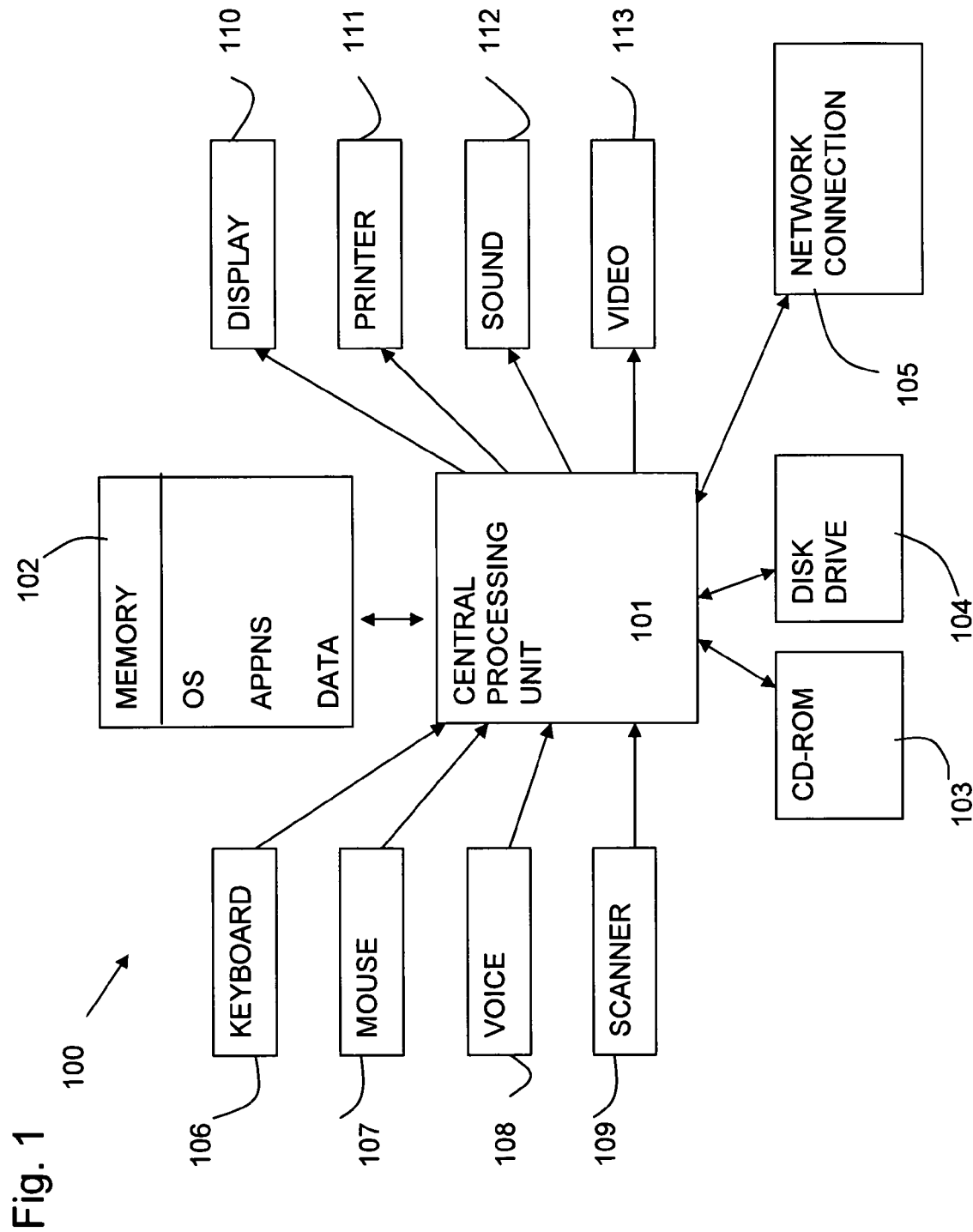
FIG. 1 is a block diagram detailing a computer system in which the present invention may be implemented.

Referring to FIG. 1, a computer system 100 is shown in which an embodiment of the present invention may be implemented. The computer system 100 comprises a central processing unit 101 with primary storage in the form of memory 102 (RAM and ROM). The memory 102 stores program information and data acted on or created by application programs. The program information includes the operating system code for the computer system 100 and application code for applications running on the computer system 100. Secondary storage may include optical disk storage 103 and magnetic disk storage 104. Data and program information can also be stored and accessed from the secondary storage.

The computer system 100 includes a network connection 105 for interfacing the computer system 100 to a network such as a local area network (LAN) or the Internet. The computer system 100 may also have other external source communication means such as a fax modem or telephone connection.

The central processing unit 101 comprises inputs in the form of, as examples, a keyboard 106, a mouse 107, voice input 108, and a scanner 109 for inputting text, images, graphics, and/or the like. Outputs from the central processing unit 100 may include a display 110, a printer 111, sound output 112, video output 113, etc.

In a distributed system, a computer system 100, as shown in FIG. 1, may be connected via the network connection 105 to a server (not shown) on which applications may be run remotely from the central processing unit 101 which is then referred to as a client system.

Applications may run on the computer system 100 from storage 103, 104 or via a network connection 105, which may include spread sheet applications, database applications, and/or other storage and retrieval mechanisms.

Figure 2:
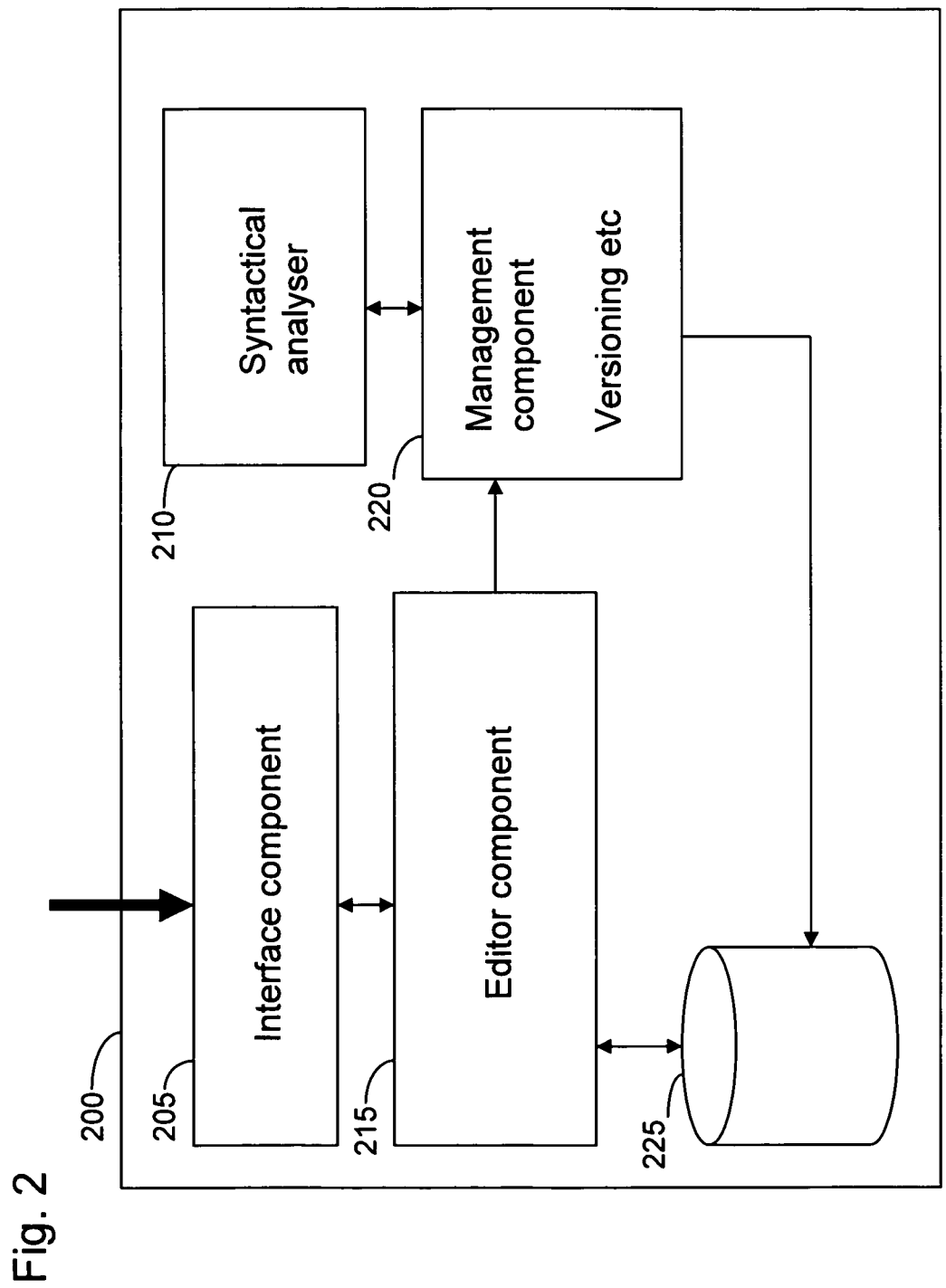
FIG. 2 is a block diagram showing a prior art source code management system.

Referring to FIG. 2, a known source code management system 200 is shown (with the exception of a syntactical analyzer component 210, which is provided by the present invention). The source code management system 200 typically provides means for a plurality of developers to edit, modify, and update source code files. Typically, a source code management system comprises an interface component 205 for selecting previously saved source code files for modification or for creating new source code files. The interface component also provides file management facilities etc. On selection of a source code file the source code file is loaded into an editor component 215.

The editor component 215 also provides functionality specific to a programming language, for example, when it is being used to edit an object oriented language, the editor component 215 may provide means for selecting classes, objects and specifying interfaces, etc. The editor component 215 provides means for multiple users editing the same source code file, at the same time. Thus, the editor component 215 interfaces with a management component 220 which provides means for versioning of source code files and means for merging changes when conflicts of updates arise.

The management component 220 stores in a data store a complete history of revisions of a source code file, i.e., a copy of each version of the source code file from when it was first created to the most recent change that has taken place. If a current version of a source code file is found to be corrupt, the management component 220 provides means for identifying a previous version of the source code file and providing 'rollback' of the source code file to the identified previous source code file.

In accordance with an embodiment of the present invention, a syntactical analyzer component 210 is provided which is operable for interfacing with the management component 220 of the source code management system 200. The syntactical analyzer component 210 is either operable for interfacing with existing source code management systems 200 and can be obtainable via a plug in component, or is developed as part of a source code management system 200.

The syntactical analyzer component 210 interfaces with the management component 220 and is triggered each time a 'save file' function is performed within the editor component 215. The syntactical analyzer component 210 can also poll the management component 220 to look for changes. The syntactical analyzer component 210 comprises a number of components which interact and interface with each other in order to detect and report on syntactic changes that have taken place in the source code.

Figure 3:
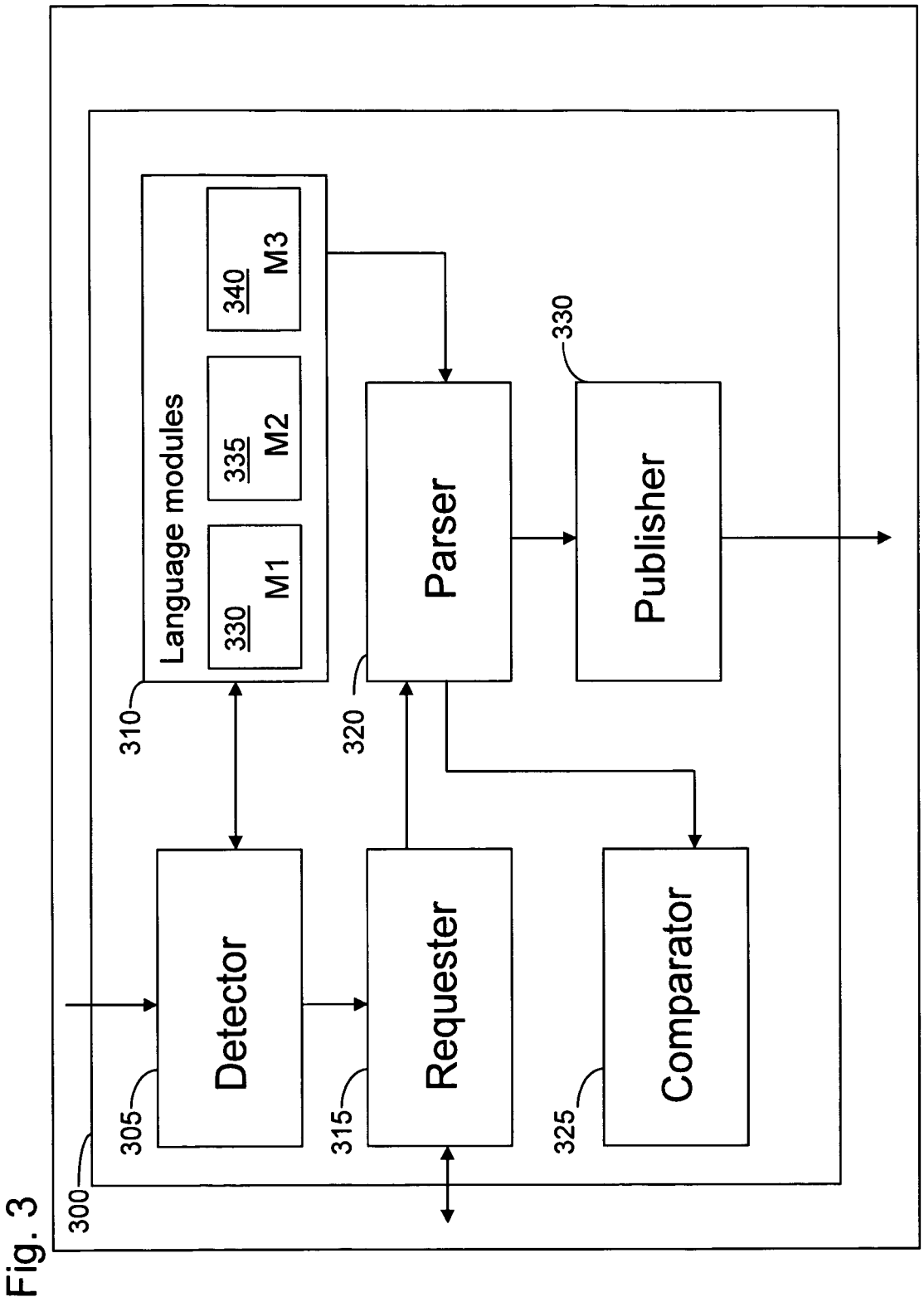
FIG. 3 is a block diagram showing the analyser component of an embodiment of the present invention.

As depicted in FIG. 3, the syntactical analyzer component 210 comprises a detector component 305 for detecting changes to source code elements in a source code file, a requester component 315 for requesting a previous version of the source code file which is associated with the source code file in which a change has been detected, a language module component 310 comprising syntactical rules associated with a programming language, a parser component 320 for parsing the current version of the source code file and a previous version of the source code file and for building an in-memory representations of each, a comparator component 325 for comparing the in-memory representation of the current version of the source code with the in-memory representation of the previous version to identify the syntactical changes, a subscription component for receiving a subscription to receive notifications of contextual information identifying the changes made to a source code element of a source code file, and a publisher component 330 for publishing the identified syntactical changes. Each of these components will now be explained in turn.

The detector component 305 interfaces with the management component 220 and is triggered on a 'save file' or other action which indicates a change has been made to a source code element. Alternatively, the detector component 305 comprises means for polling the management component 220 to detect when a change has occurred to a source code element.

The detector component 305 interfaces with a data store and determines the name of the source code file and the source code file type that has been changed. The source code file type is determined by the file extension of the source code file, or other means (such as a flag or metadata associated with the stored source code file). For example, if the file extension is .java this would indicate that the source code file is within the Java programming language (Java is a registered trademark of Sun Microsystems Inc. in the US and other countries). Using the file name of the source code file, the detector component 305 communicates a request to the requester component 315 to locate a copy of a previous version of the source code file.

The requester component 315 communicates the located previous version of the source code file to the parser component 320 for processing. The detector component 305 also communicates the current version of the source code file to the parser component 320 for processing.

In order to syntactically analyze the two versions of the source code file, the detector component 305 interfaces with the language module component 310 which stores syntactic rules associated with each type of programming language. For example, a first set of syntactic rules being associated with the Java programming language, a second set of rules being associated with the C++ programming language, a third set of rules being associated with the Perl programming language, and so on. A new set of rules can be linked with the detector component 305 as and when is needed.

The set of rules comprise rules which understand how a particular programming language is constructed. For example, a programming language defines a set of abstract constructs, such as a package, class, methods, fields, etc. These constructs are often different for each programming language even though similar constructs may be found in several languages. Within these constructs various relationships exist, for example, a package comprises a class, a class comprises fields and methods, and a class implements an interface, etc.

The abstract constructs and their relationships are represented by predefined syntactical constructs in the source code. For example, a Java class will be defined by the syntactical construct 'class <classname> { }'; the fact that the class belongs to a package will be specified by a single line at the top of the file 'package <packagename>'.

The parser component 320 using the appropriate rule set, as determined by the detector component 305, parses the latest version of the source code file to identify the syntactic constructs of the programming language and builds an in-memory representation of the corresponding abstract constructs and their relationships.

Once this is complete, the parser component 320 proceeds to parse and build an in-memory representation of the corresponding abstract constructs of the previous version of the source code file and the current version of the source code file.

FIG. 4 shows two source code files, i.e., a previous version of a source code file and a new version of the source code file whereby a change in one of the source code elements has been detected.

Both source code packages commence with the package name, i.e., package com.ibm.somepackage, followed by the type of class and the type of method that belongs to the class.

In the previous version of the file the class construct is a public class and within this public class there is a method construct which is a protected method construct with a string parameter.

However, the newer version of the same source code package has changed and this is reflected in the method construct which was previously protected and which is now public—in this example there are no other changes.

The parser component 320 parses each of the files and builds an in-memory representation of each of the files using the rules obtained from the language module in order to identify the change.

Figure 5:
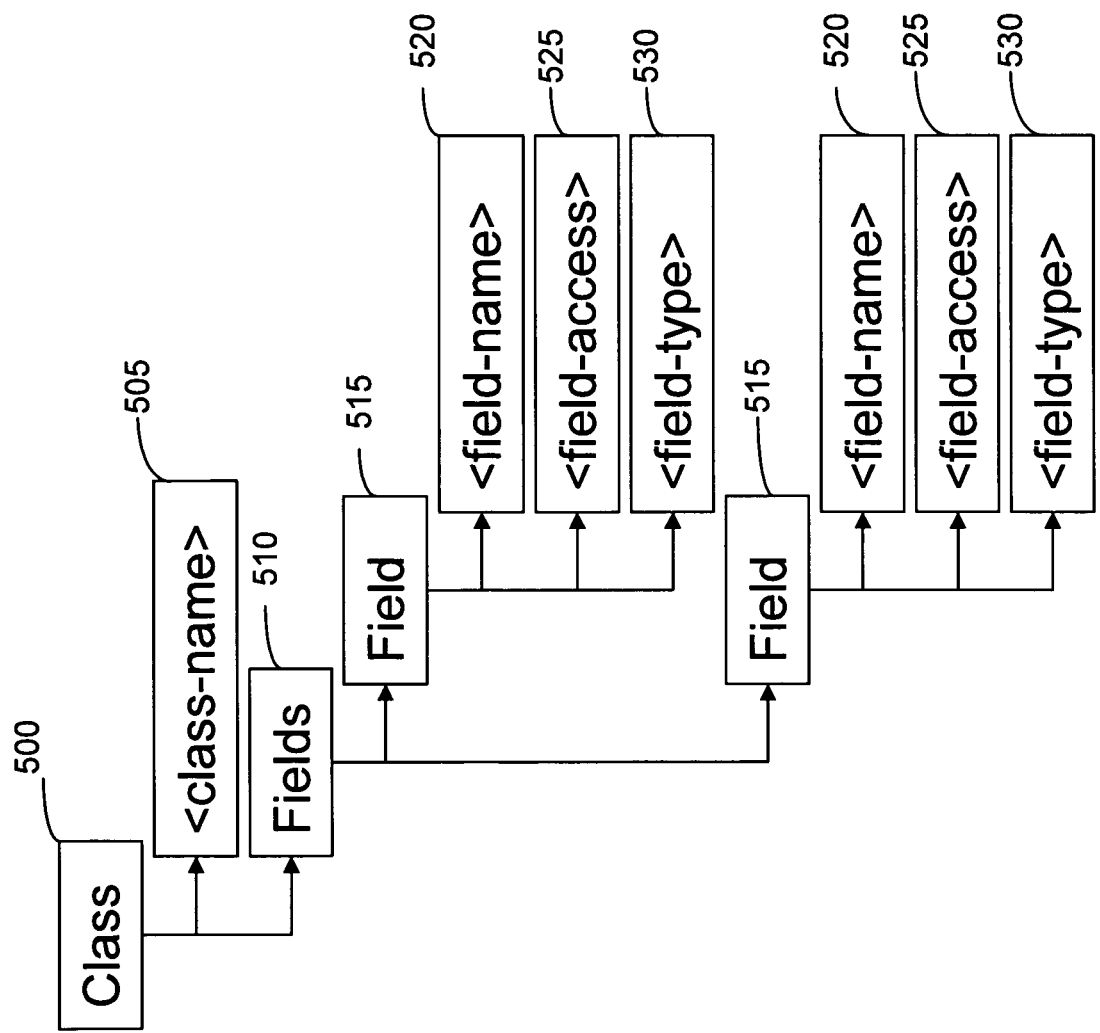
FIG. 5 is a block diagram detailing an in-memory representation of a programming language in accordance with an embodiment of the present invention.

FIG. 5 shows an example of an in-memory representation. The in-memory representation is shown as a tree structure defined by the language constructs of a particular programming language. In this example, the language constructs comprise a class 500 having a class name 505. The class also comprises a number of fields 510 and each field 515 having a field name 520, a field access 525, and a field type 530. Each of these constructs is populated with the data provided in the corresponding syntactic construct in the source code file.

The comparator component 315 compares the in-memory representations with each other. A third in-memory representation is produced expressing the differences detected in the comparison of the semantics in terms of the semantics appropriate to the programming language.

A publisher component 330 (FIG. 3) is responsible for publishing the detected changes to the source code in the form of contextual information that identifies the changes, i.e., the changes are expressed using the terminology appropriate to the programming language.

In an embodiment, the publisher component 330 publishes the detected changes by using a data feed technology. A number of different feed standards can be used such as RSS, etc. In this instance the data feed can be read into a feed reading tool in order to receive the change notifications. Alternatively, a proprietary feed format, such as one based on the XML standard, can be used to notify detected changes via a number of client IDE extensions. The publisher component is also responsible for maintaining a list of users to notify. The list can be created by a subscription mechanism, by user's that wish to be notified of detected changes. The subscription process can also be used to set the scope of the notification to receive; for example, a developer is likely to be only interested in notifications of changes in the source code that his own code depends upon. This option can be specified when the user subscribes.

Figure 6:
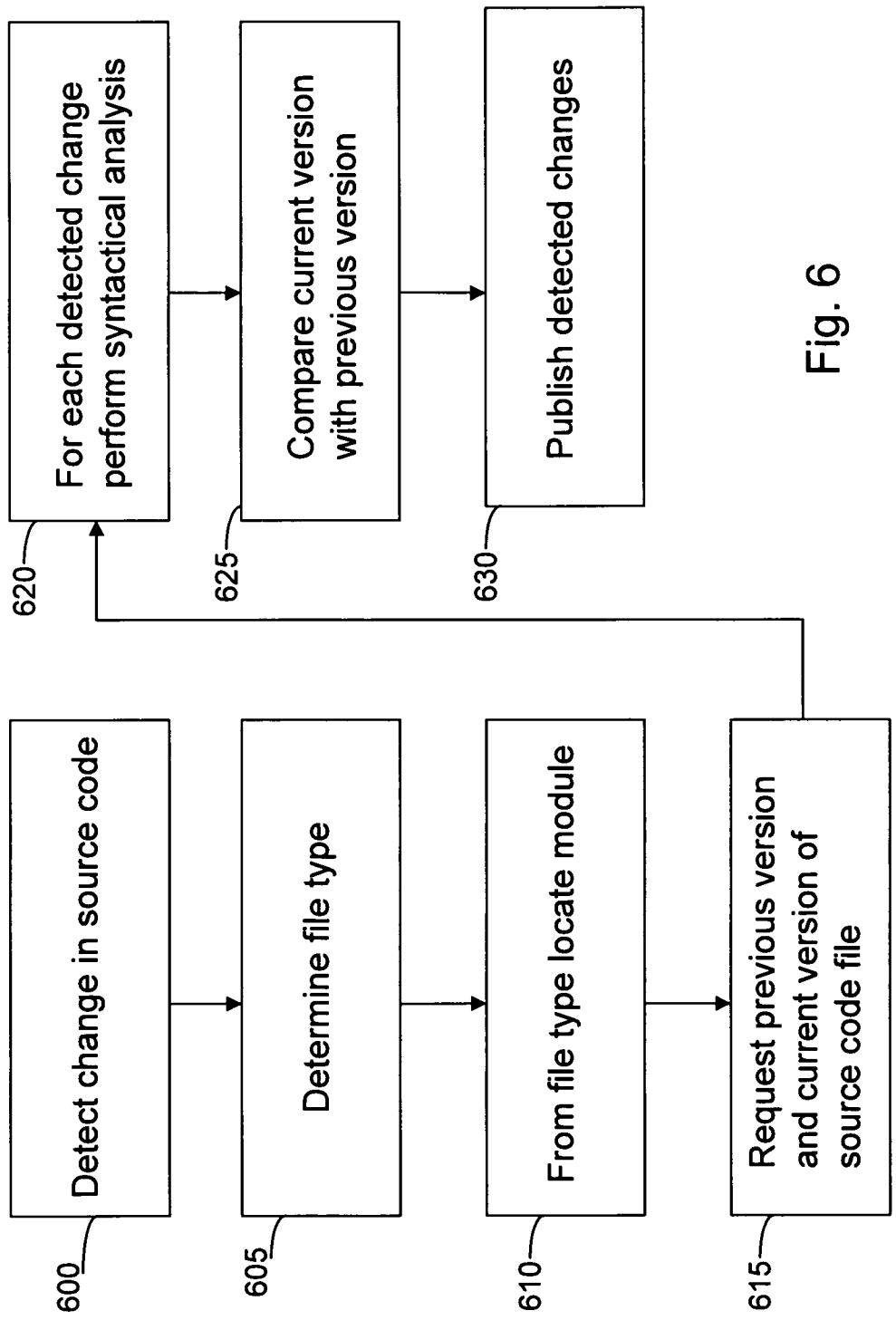
FIG. 6 is a flow chart detailing the operation of an embodiment of the present invention.

FIG. 6 illustrates an illustrative process in accordance with an embodiment of the invention. At 600, the detector component detects that a change has been made to a source code file, i.e., because the source code file has been saved. The name and the file type of the source code file is determined at 605, i.e., to determine the name of the file in which a previous version of the source code file can be located and to determine the programming language used within the source file. Using this information the detector component 305 sends a request to the language module component to request access to the language module for the detected programming language, at 615. The detector component 305 communicates to the requester component 315 a message asking for the previous version of the source code file that was stored by the source code management system 200 and transmits this version to the parser component 320.

The parser component 320 parses both versions of the source code file to determine the syntactic constructs of the programming language and to understand the relationship between each of the syntactic constructs within the source code. The parser component 320 then builds an in-memory representation of the source code constructs for each source code file and compares, at 620 and 625, each of the source code constructs to determine where the detected change has occurred and what has changed.

At 630, the publisher component 330 publishes, via a publishing mechanism, the detected source code change in the form of contextual information that identifies the changes, i.e., the changes are expressed using the terminology appropriate to the programming language.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example. Further, an article of manufacture including such a computer program is also envisaged as an aspect of the present invention.

A computer program for implementing various functions or for conveying information may be supplied on media such as one or more DVD/CD-ROMs and/or floppy disks and then stored on a hard disk, for example. A program implementable by a data processing system may also be supplied on a telecommunications medium, for example over a telecommunications network and/or the Internet, and embodied as an electronic signal. For a data processing system operating as a wireless terminal over a radio telephone network, the telecommunications medium may be a radio frequency carrier wave carrying suitable encoded signals representing the computer program and data. Optionally, the carrier wave may be an optical carrier wave for an optical fiber link or any other suitable carrier medium for a telecommunications system.

It will be understood by those skilled in the art that, although the present invention has been described in relation to the preceding example embodiments, the invention is not limited thereto and that there are many possible variations and modifications which fall within the scope of the invention.

The scope of the present disclosure includes any novel feature or combination of features disclosed herein. The applicant hereby gives notice that new claims may be formulated to such features or combination of features during prosecution of this application or of any such further applications derived there from. In particular, with reference to the appended claims, features from dependent claims may be combined with those of the independent claims and features from respective independent claims may be combined in any appropriate manner and not merely in the specific combinations enumerated in the claims.

The invention claimed is:

1. An apparatus for identifying a contextual change to a source code file, in a development environment, the apparatus comprising:
   a computer device, including:
   a detector component for detecting a modification to the source code file, wherein the detector component retrieves, in response to detecting the modification to the source code file, a syntactic rule set for a programming language of the modified source code file, the syntactic rule set including a plurality of syntactic constructs for the programming language;
   a requester component for retrieving a previous version of the modified source code file;
   a parser component for parsing a first source code set associated with the source code file and a second source code set associated with the previous version of the source code file and for building an in-memory representation of the first and second source code sets, wherein the parser component, in response to the detector component retrieving the syntactic rule set and determining a plurality of relationships between the plurality of syntactic constructs, builds the in-memory representation using the syntactic rule set;
   a comparator component for comparing the in-memory representation of the first source code set with the in-memory representation of the second source code set in order to generate contextual information identifying a change made to a source code element associated with the modified source code set;
   a subscription component for receiving, from a subscriber, a subscription for notification of the generated contextual information, the subscription identifying a portion of the source code file; and
   a publisher component for publishing, using a data feed, the generated contextual information based on the received subscription, wherein the generated contextual information is published to the subscriber only if the comparator component identifies that a change has been made to the portion of the source code file identified by the subscriber in the subscription.

2. The apparatus as claimed in claim 1, wherein the detector component further comprises a component for detecting the programming language associated with the modified source code file or the previous version of the source code file, and a component for retrieving a rule set associated with the detected programming language.

3. The apparatus as claimed in claim 2, wherein the rule set comprises rules for identifying syntactic constructs of the identified programming language.

4. The apparatus as claimed in claim 3, wherein the in-memory representation comprises a tree data structure defining relationships between the syntactic constructs of the programming language.

5. A computer-implemented method for identifying a contextual change to a source code file, in a development environment, comprising:
   detecting a modification to the source code file has been made;
   retrieving, in response to detecting the modification to the source code file, a syntactic rule set for a programming language of the modified source code file, the syntactic rule set including a plurality of syntactic constructs for the programming language;
   retrieving a previous version of the modified source code file;
   parsing a first source code set associated with the source code file and a second source code set associated with the previous version of the source code file and for building an in-memory representation of the first and second source code sets;
   determining a plurality of relationships between the plurality of syntactic constructs;
   building, in response to the detector component retrieving the syntactic rule set, the in-memory representation using the syntactic rule set;
   comparing the in-memory representation of the first source code set with the in-memory representation of the second source code set in order to generate contextual information identifying a change made to a source code element associated with the modified source code set;
   receiving, from a subscriber, a subscription for notification of the generated contextual information, the subscription identifying a portion of the source code file; and
   publishing, using a data feed, the generated contextual information based on the received subscription, wherein the generated contextual information is published to the subscriber only if the comparing identifies that a change has been made to the portion of the source code file indicated by the subscriber in the subscription.

6. The method as claimed in claim 5, wherein the detecting further comprises detecting the programming language associated with the modified source code file or the previous version of the source code file and retrieving a rule set associated with the detected programming language.

7. The method as claimed in claim 6, wherein the rule set comprises rules for identifying syntactic constructs of the identified programming language.

8. The method as claimed in claim 7, wherein the in-memory representation comprises a tree data structure defining relationships between the syntactic constructs of the programming language.

9. A computer program product loadable into the internal non-transitory memory of a computer, for identifying a contextual change to a source code file, in a development environment, when the program product is run on a computer, the program product comprising program code for:
   detecting a modification to the source code file has been made;
   retrieving, in response to detecting the modification to the source code file, a syntactic rule set for a programming language of the modified source code file, the syntactic rule set including a plurality of syntactic constructs for the programming language;
   retrieving a previous version of the modified source code file;
   parsing a first source code set associated with the source code file and a second source code set associated with the previous version of the source code file and for building an in-memory representation of the first and second source code sets;
   determining a plurality of relationships between the plurality of syntactic constructs;
   building, in response to the detector component retrieving the syntactic rule set, the in-memory representation using the syntactic rule set;
   comparing the in-memory representation of the first source code set with the in-memory representation of the second source code set in order to generate contextual information identifying a change made to a source code element associated with the modified source code set;

receiving, from a subscriber, a subscription for notification of the generated contextual information, the subscription identifying a portion of the source code file; and publishing, using a data feed, the generated contextual information based on the received subscription, wherein the generated contextual information is published to the subscriber only if the comparing identifies that a change has been made to the portion of the source code file indicated by the subscriber in the subscription.

10. The program product as claimed in claim 9, wherein the detecting further comprises detecting the programming language associated with the modified source code file or the previous version of the source code file and retrieving a rule set associated with the detected programming language.

11. The program product as claimed in claim 10, wherein the rule set comprises rules for identifying syntactic constructs of the identified programming language.

12. The program product as claimed in claim 11, wherein the in-memory representation comprises a tree data structure defining relationships between the syntactic constructs of the programming language.

13. The apparatus as claimed in claim 1, wherein the detecting is in response to a saving file activation in an editor component.

14. The apparatus as claimed in claim 1, wherein the detecting is in response to a polling of a management component.

15. The apparatus as claimed in claim 1, wherein the in-memory representation is a tree structure defined by a programming language construct of the first and second source code sets.

* * * * *